United States Patent [19]
Miller et al.

[11] Patent Number: 5,129,199
[45] Date of Patent: Jul. 14, 1992

[54] LATCH FOR TILTING ROTATABLE TOWER

[75] Inventors: David B. Miller, Advance; Jeffrey D. Matlock, Clemmons, both of N.C.

[73] Assignee: Ingersoll-Rand Company, Woodcliff Lake, N.J.

[21] Appl. No.: 582,354

[22] Filed: Sep. 14, 1990

[51] Int. Cl.⁵ .............................................. E04H 12/00
[52] U.S. Cl. .................................... 52/121; 52/117; 182/65
[58] Field of Search ................... 182/65; 52/116, 117

[56] References Cited

U.S. PATENT DOCUMENTS

| | | | |
|---|---|---|---|
| 2,888,149 | 5/1959 | Troche | 52/117 |
| 3,463,916 | 8/1969 | De Bella | 52/117 |

Primary Examiner—Richard E. Chilcot, Jr.
Assistant Examiner—Wynn Wood
Attorney, Agent, or Firm—Glenn B. Foster

[57] ABSTRACT

An apparatus comprises a support and a tower pivotally attached to the support and movable relative to said support between a raised and a lowered position. The tower is rotatable to and from a predetermined position about a longitudinal axis thereof when the tower is the raised position. A latch device is displaceable between a secured position and a non-secured position, the tower being prevented from moving to the lowered position when the tower is raised and the latch device is in the secured position. A release system prevents displacement of the latch device from the secured position when the tower is not in the predetermined and raised positions. The release system permits displacement of the latch device from the secured position when the tower is in the predetermined and raised positions. The latch device includes a plunger and a biasing member located within a latch housing. The release system includes a contact element which is connected to the plunger.

23 Claims, 3 Drawing Sheets

LATCH FOR TILTING ROTATABLE TOWER

BACKGROUND OF THE INVENTION

This invention relates generally to support latch and more particularly to a latch which maintains a support tower in an upright locked position, and permits lowering of the tower only when the tower is aligned in a desired orientation.

While it is well known to apply locks to maintain support towers in an upright position, these locks have usually been applied to a location along the length of the tower. The forces which the towers produce may overcome the latches because of the proximity of the latches to the pivot point of the tower.

These towers can typically be rotated when they are in a raised position. It is often desired to lower the tower only when the tower is oriented in a predetermined position about a longitudinal axis. For example, when there are lights attached to the tower, it may be desired to have the lights lay flat when the lights are lowered. There is no known device which requires that the tower be aligned in a predetermined position to unlock the tower prior to lowering.

The foregoing illustrates limitations known to exist in present tower locks. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus comprising a support and a tower attached to the support and movable relative to said support between a raised and a lowered position. The tower is rotatable to and from a predetermined position, about a longitudinal axis thereof, when located in the raised position. Latch means is displaceable between a secured position and a non-secured position, the tower being prevented from moving from the raised position when the latch means is in the secured position. Release means prevents displacement of the latch means from the secured position when the tower is not in the predetermined and raised positions. The release means permits displacement of the latch means from the secured position when the tower is in the predetermined and raised positions.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
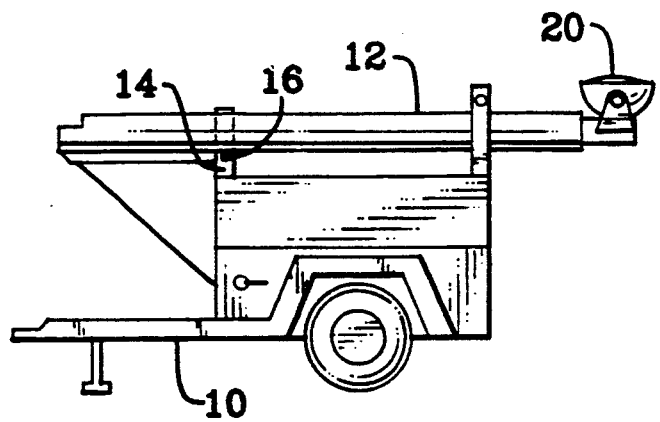
FIG. 1 is a side elevational view illustrating an embodiment of a vehicle with a pivoting tower of the instant invention, with the tower in a lowered position.

In this disclosure, identical elements in alternate embodiments will be referred to by an identical reference characters.

A vehicle 10 includes a support 14 rigidly attached thereto. The support has a pivot point 16. A cradle 15 is pivotally supported by the support 14 about pivot point 16. A tower 12 is rotatably retained within the cradle 15 by a rotating mount 17. The cradle 15 includes sleeve 18 which supports the tower while the tower rotates within the cradle, as may be desired to precisely locate light, tool or other object 20 which is supported by the lower 12. The cradle 15 also includes plates 21, 23, 25 and 27. Sleeve 18 and plates 21, 23, 25 and 27 act and move as a single rigid unit which rotatably supports tower 12 while permitting the tower to rotate about its axis.

The rotating mount 17 performs two functions. First, it permits relative rotation between the tower 12 and the cradle 15. Second, it restricts excessive lateral or axial displacement between the tower 12 and the cradle 15. Any type of rotational mount between the tower and the cradle, which is well known in the art, may be used.

Figure 2:
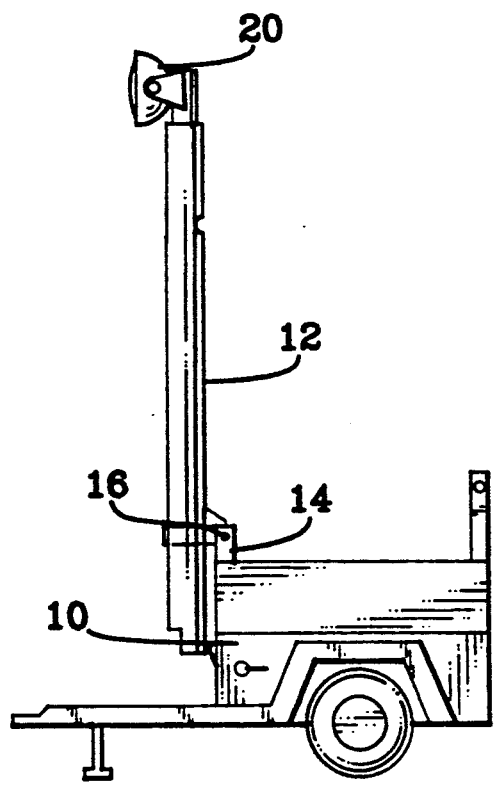
FIG. 2 is a view similar to FIG. 1, with the tower in a raised position.
Figure 3:
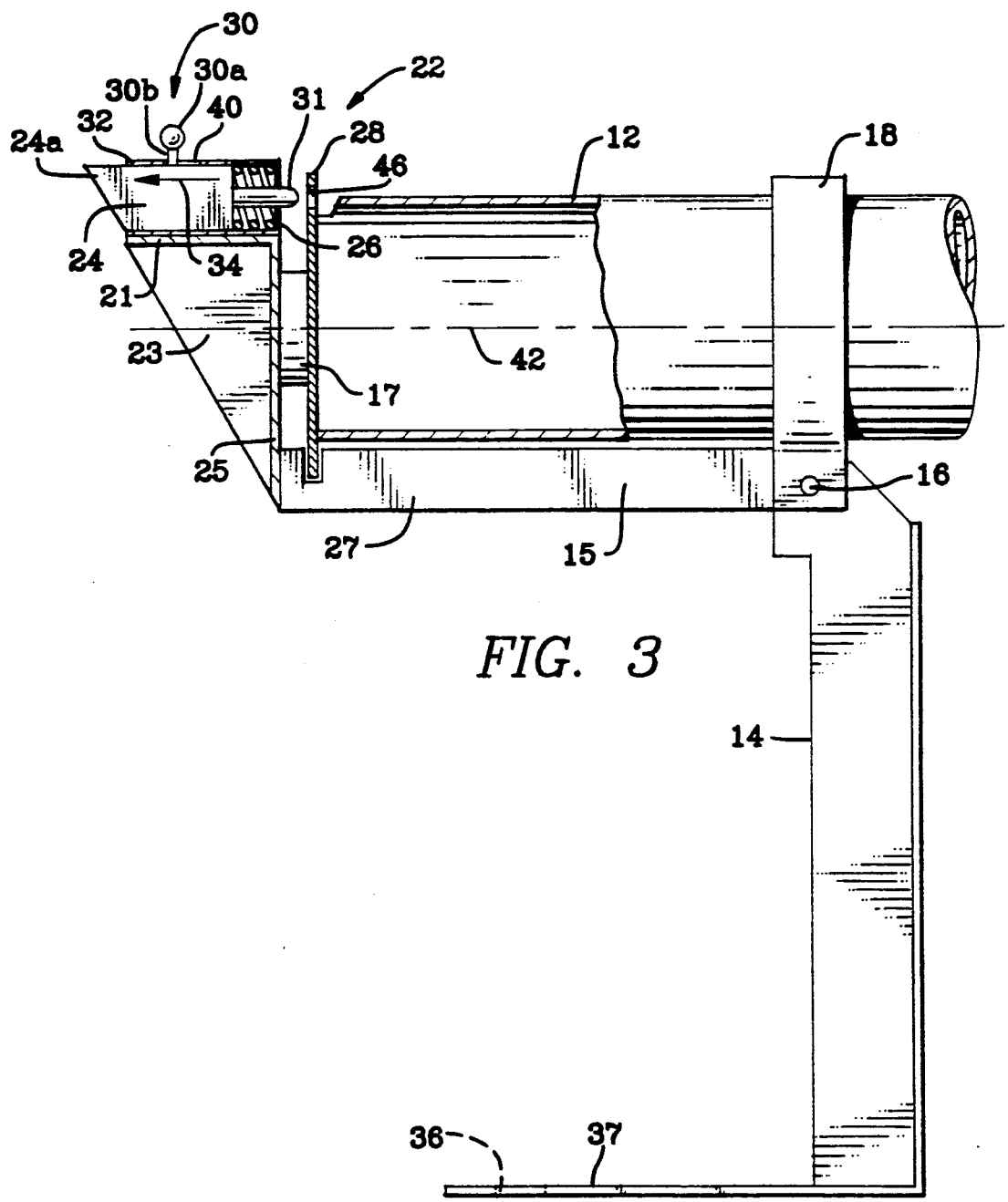
FIG. 3 is a cross sectional side view illustrating portions of the tower in a lowered position, a support for the tower and a tower latch.
Figure 4:
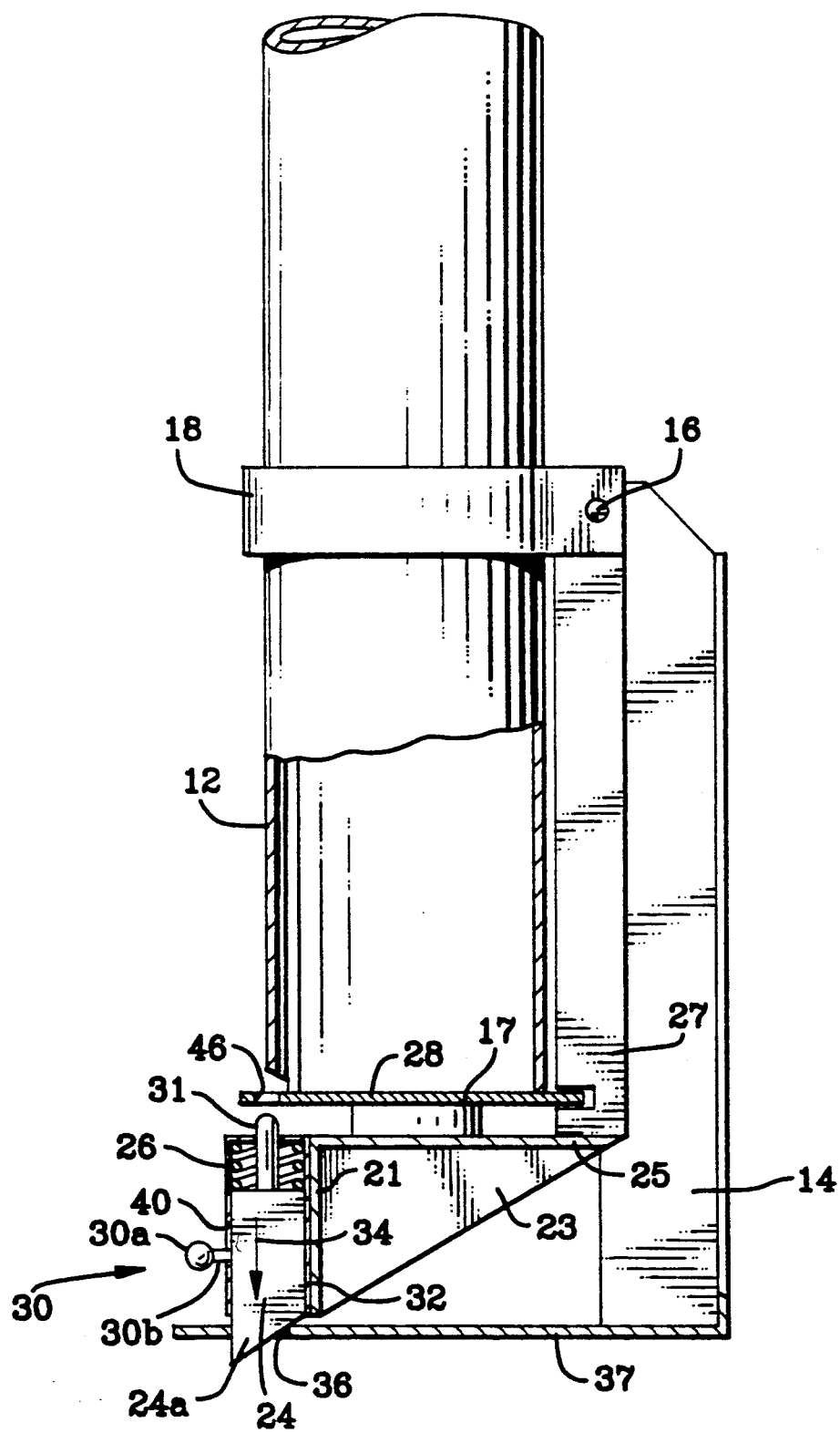
FIG. 4 is a view similar to FIG. 3, except illustrating a raised position.

The tower 12 and the cradle 15 may be pivoted between a raised position as illustrated in FIGS. 2 and 4, and a lowered position as illustrated in FIGS. 1 and 3. It is desired to have the tower in the lowered position when the vehicle 10 is being transported, and a raised position when the light or tool 20 is being used.

A latch means 22 is used to maintain the tower in the raised position. The latch means includes a plunger 24, a biasing means 26 such as a spring, a release or alignment means 28, a retraction means 30, a contact member 31 and a latch housing 32. The latch housing 32 is rigidly affixed to the plate 21 of the cradle 15 and thereby is displaced as a portion of the cradle when the cradle is displaced. The release means 28 is rigidly affixed (for example welded) to the tower and rotates therewith as a portion of the tower. The rotary mount 17 rotatably supports the release means 28 and the tower 12 within the cradle 15 as previously described.

The plunger 24 is displaceable within the latch housing. The biasing means 26 and the plunger are both fully encased in the housing (except for a first end 24a of the plunger 24 which extends out of the housing, the biasing means biases the plunger in an extended direction 34. When the tower is in a raised position and the plunger is fully displaced in the extended direction 34 towards a secured position (illustrated in FIG. 4 in solid), then the plunger will engage a plunger recess 36 formed in a baseplate 37 thereby locking the tower 12 in the raised position. The baseplate 37 is a rigid portion of support 14.

To release the plunger 24 from the recess 36, the retraction means 30 is used. The retraction means 30 includes a retraction stem 30b and a retraction head 30a. Sufficient pressure applied to the retraction head 30a will displace the plunger 24 within the latch housing 32. The force applied to retraction arm 38 will cause displacement of the plunger 24 from the plunger recess 36 to a non-secured position (illustrated in FIG. 4 in dotted lines), and permit lowering of the tower 12.

Since the tower 12 rotates within sleeve 18 about a longitudinal axis 42 when the tower and the cradle 15 is in the raised position, it might become necessary to align the tower in a predetermined position when the tower is being lowered to prevent damage of the tower 12 or object 20 during transition or transportation.

To limit lowering of the tower 12 when not properly aligned, the release means 28 (such as a plate) is fixedly connected about the circumference of the tower. When the tower is properly aligned into a predetermined position, the contact means 31 will be aligned with, and displaceable through, an aperture 46 formed in the release means 28.

When the tower 12 is not properly aligned, the aperture 46 formed in the release means 28 will not be aligned with the contact means 31. Contact between the contact means 31 and the release means 28 will prevent the travel of the plunger 24 away from the secured position, and will effectively lock the tower in the raised position.

Locating the latch means 22 at an axial end of the cradle 14 will locate the latch means as far from the pivot point 16 as possible while still being located on the tower 12. In this manner, the latch means will exert the greatest resistance against a pivoting force exerted on the tower.

Having described the invention, what is claimed is:

1. An apparatus comprising:
    a support;
    a tower pivotally attached to said support and movable relative to said support between a raised and a lowered position, the tower being rotatable to and from a predetermined position, about a longitudinal axis thereof, when in the raised position;
    latch means displaceable between a secured position and a non-secured position, the tower being prevented from moving from the raised position when the latch means is in the secured position;
    release means for preventing displacement of the latch means from the secured position when the tower is not in the predetermined and raised positions, the release means permitting displacement of the latch means from the secured position when the tower is in the predetermined and raised positions; and
    a cradle pivotally attached to said support and movable relative to the support, the tower being rotatably disposed within the cradle about said longitudinal axis of the tower.

2. The apparatus as described in claim 1, wherein the latch means comprises:
    an extendably displaceable plunger movable to and from an extended position, whereby moving the plunger to the extended position places the latch means in the secured position.

3. The apparatus as described in claim 2, wherein the latch means further comprises:
    biasing means for biasing the plunger into the extended position.

4. The apparatus as described in claim 3, wherein the latch means further comprises:
    retraction means for retracting the plunger from the extended position.

5. The apparatus as described in claim 4, wherein the release means includes a portion affixed to the tower, and having an aperture.

6. The apparatus as described in claim 5, wherein the release means further comprises:
    a contact member fixedly connected to the plunger, said aperture being located wherein the contact member cannot extend through the aperture when the tower is not in the predetermined position.

7. The apparatus as described in claim 5, wherein the release means further comprises:
    a contact member fixedly connected to the plunger, said aperture being located wherein the contact member can extend through the aperture when the tower is in the predetermined position.

8. The apparatus as described in claim 1, further comprising:
    rotating means, secured to the cradle, for securing the tower to the cradle while permitting rotation of the tower about the longitudinal axis.

9. The apparatus as described in claim 2, further comprising:
    a cradle, pivotably movable relative to the support, the tower being rotatably disposed within the cradle about the longitudinal axis.

10. The apparatus as described in claim 9, wherein the latch means further comprises a latch housing affixed to the cradle, the plunger being rotatably displaceably disposed within the cradle.

11. The apparatus as described in claim 1, wherein the latch means secures the axial end of the tower.

12. A portable light tower apparatus comprising:
    a portable chassis;
    a support rigidly connected to the chassis;
    a tower pivotally attached to said support and movable relative to said support between a raised and a lowered position, the tower being rotatable to and from a predetermined position, about a longitudinal axis thereof, when in the raised position;
    latch means displaceable between a secured position and a non-secured position, the tower being prevented from moving from the raised position when the latch means is in the secured position;
    release means for preventing displacement of the latch means from the secured position when the tower is not in the predetermined and raised positions, the release means permitting displacement of the latch means from the secured position when the tower is in the predetermined and raised positions; and
    a cradle pivotally attached to said support and movable relative to the support, the tower being rotatably disposed within the cradle about said longitudinal axis of the tower.

13. The apparatus as described in claim 12, wherein the latch means comprises:
    an extendably displaceable plunger movable to and from an extended position, whereby moving the plunger to the extended position places the latch means in the secured position.

14. The apparatus as described in claim 13, wherein the latch means further comprises:
    biasing means for biasing the plunger into the extended position.

15. The apparatus as described in claim 14, wherein the latch means further comprises:
    retraction means for retracting the plunger from the extended position.

16. The apparatus as described in claim 15, wherein the release means includes a portion affixed to the tower.

17. The apparatus as described in claim 16, wherein the release means further comprises:
    a contact member fixedly connected to the plunger, said aperture being located wherein the contact member cannot extend through the aperture when the tower is not in the predetermined position.

18. The apparatus as described in claim 16, wherein the release means further comprises:
  a contact member fixedly connected to the plunger, said aperture being located wherein the contact member can extend through the aperture when the tower is in the predetermined position.

19. The apparatus as described in claim 18, further comprising:
  rotating means, secured to the cradle, for securing the tower to the cradle while permitting rotation of the tower about the longitudinal axis.

20. The apparatus as described in claim 13, further comprising:
  a cradle, pivotably movable relative to the support, the tower being rotatably disposed within the cradle about the longitudinal axis.

21. The apparatus as described in claim 20, wherein the latch means further comprises a latch housing affixed to the cradle, the plunger being rotatably displaceably disposed within the cradle.

22. The apparatus as described in claim 12, wherein the latch means secures the axial end of the tower.

23. An apparatus comprising:
  a support;
  a tower pivotally attached to said support and movable relative to said support between a raised and a lowered position, the tower being rotatable to and from a predetermined position, about a longitudinal axis thereof, when in the raised position;
  latch means displaceable between a secured position and a non-secured position, the tower being prevented from moving from the raised position when the latch means is in the secured position;
  release means for preventing displacement of the latch means from the secured position when the tower is not in the predetermined and raised positions, the release means permitting displacement of the latch means from the secured position when the tower is in the predetermined and raised positions; and
  cradle means, pivotally attached to the support and movable relative to the support, for rotatably supporting said tower about said longitudinal axis.

* * * * *